3,793,465
PREPARATION OF AN ACIDIFIED MILK
PRODUCT IN POWDER FORM
Hans-Ueli Bohren, La Tour-de-Peilz, Switzerland, assignor to Societe d'Assistance Technique pour Produits Nestle S.A., Lausanne, Switzerland
No Drawing. Filed Jan. 25, 1972, Ser. No. 220,718
Claims priority, application Switzerland, Feb. 10, 1971, 1,944/71
Int. Cl. A23c 9/12
U.S. Cl. 426—187                    13 Claims

ABSTRACT OF THE DISCLOSURE

Method of manufacture of an acidified milk product in powder form in which a fraction of a milk product in powder form biologically acidified to a pH of 4.2 to 4.4 is combined with another fraction of a nonacidified milk product in powder form in order to obtain a pH above 5.2 immediately after reconstitution with water, the weight of the water being 5 to 10 times the weight of the powder, and an acid compound with controlled release is combined with the two said fractions of milk product.

---

The present invention relates to a method of manufacture of an acidified milk product in powder form, particularly of a yoghurt in powder form, and to the resulting product.

Yoghurt, for example, is a milk product biologically acidified by means of *Lactobacillus bulgaricus* and *Streptococcus thermophilus*, the pH of which is 4.4 to 4.6 approximately and having a gelled texture.

It has been found that during drying, this characteristic texture of the yoghurt is lost: the yoghurt reconstituted from yoghurt powder with water remains fluid and the coagulated phase tends to separate rapidly from the aqueous phase.

The addition of thickening agents being generally not accepted by the milk regulations, it was considered to interrupt the biological acidification before drying and to complete the acidification by simply adding an edible acid to the powder and water during reconstitution, but the experiment proved unsuccessful. The post-acidification in itself does not give the required texture. Moreover, the interruption of the biological acidification of the yoghurt is done essentially at the cost of the action of the *Lactobacillus bulgaricus* and the characteristic taste of the yoghurt is not even obtained.

The method according to the invention obviates these inconveniences. Surprisingly, it was found possible to obtain the required texture, starting from a partially acidified milk product in powder form mixed with water, the weight of the water being added being 5 to 10 times the weight of the powder, and the pH of the mixture being above 5.2 immediately after reconstitution, if the acidification is completed very progressively, preferably within half an hour to two hours approximately. This progressive acidification can be done by means of an acid compound with controlled release, preferably a compound made according to the method described in the parallel copending U.S. Pat. application No. 220,716 of the same assignee.

In the method according to the invention, a fraction of a milk product biologically acidified to a pH of 4.2 to 4.4 is combined with another fraction of a non-acidified milk product in powder form in order to obtain a pH above 5.2 immediately after reconstitution with water, the weight of the water being 5 to 10 times the weight of the powder, and an acid compound with controlled release is combined with the two said fractions of milk product in powder form.

As a nonlimiting example, the sequence of operations is as follows:

Fresh skimmed and/or standardized milk is pasteurized, concentrated and homogenized. 70 to 80% of the milk, concentrated to 35 to 40% dry matter content, is cooled to 6 to 8° C. and left to rest at this temperature. The remaining 20 to 30% is diluted to approximately 21% dry matter content by adding standardized and pasteurized milk or sterile water. This latter part is inoculated with yoghurt cultures, incubated at 42 to 43° C. until pH reaches 4.2 to 4.4 (55 to 58° Soxhlet-Henkel) and homogenized, then cooled to 10 to 15° C.

As the case may be, sugar is added to the non acidified part and/or to the acidified part.

Both parts are thereafter dried by conventional methods, then reunited. As the case may be, both parts can be injected simultaneously by different nozzles in a common drying chamber. The temperature of the drying chamber is 60 to 100° C., preferably 60 to 70° C.

The powder thus obtained is only partially acidified. When reconstituted with 5 to 10 times its weight of water (the dry matter representing then approximately 15%) the pH of the suspension is above 5.2.

An acid compound with controlled release is then combined with the powder. This is an acid in solid form at ambient temperature or mixed with a solid carrier coated with an edible fat solid at ambient temperature and containing an emulsifier.

In a preferred embodiment, the acid is chosen in the group comprising citric acid, lactic acid or an acid fruit concentrate for example. If the acid is in solid form, it must be finely ground in order that the particle size is between 10 and 100 micrometers. If it is in liquid form, it is necessary to mix it before grinding with a solid carrier such as glucose, sucrose or protein.

An edible coloring matter and/or aroma can be added to the acid.

The melting point of the fat, the composition and the percentage of emulsifier must be chosen in order to obtain the required releasing time for the acid, preferably half an hour to two hours with the liquid normally used for reconstitution, water at ambient temperature for example.

The melting point of the fat must be 45 to 60° C., preferably 50 to 52° C. In some cases it may be advantageous to add to the fat not only an emulsifier, but also an antioxidant such as tocopherol, butylhydroxyanisole or butylhydroxytoluene.

Any edible fat solid at ambient temperature is suitable in princpile. With yoghurt in powder form, hydrogenated butter oil will be preferred; but hydrogenated cocoa butter or hydrogenated edible oils such as soyabean, sunflower or groundnut oils can be used also.

As emulsifier, 0.1 to 10% soyabean lecithin or glyceryl monostearate or 1 to 20% glyceryl polyricinoleate are preferably used.

The acid makes 50 to 80% of the total weight of the compound, the balance (20 to 50%) comprising the edible fat, the emulsifier and as the case may be, antioxidants, aromas and coloring matter.

Coating the acid with fat can be done for example in a rotating bowl granulator, at a temperature such that the fat is liquid (45 to 60° C.) during 15 to 30 minutes. The coated acid is then left to rest at ambient temperature for some 24 hours. The compound is then cooled rapidly to crystallize the fat, for example by dipping in liquid nitrogen. The cooled granules are finally selected with a sieve, their size being preferably between 50 and 250 micrometers.

The acid of the compound is released progressively during reconstitution, within half an hour to two hours approximately.

The reconstituted product has not only the taste, but the texture and consistency of natural fresh yoghurt.

As the case may be, it can be added to the powder 1 to 10% of lyophilized yoghurt cultures, aromas, fruits in powder form, etc.

EXAMPLE 1

1000 kg. fresh milk are standardized in such a way that the milk fat is 3.5% and the solids nonfat 8.9% of the total, then pasteurized at 95 to 115° C. during a few seconds to 2 minutes. 130 kg. are taken out which are homogenized at 100, then 50 kg./cm.$^2$ in a two-headed homogenizer, cooled at 6 to 8° C. and store at this temperature.

The remaining 870 kg. are concentrated to a solid matter content of 28%, warmed at 60° C. and homogenized at 350, then 100 kg./cm.$^2$ in a two-headed homogenizer.

Approximately 280 kg. concentrated and homogenized milk are thus obtained, of which 210 kg. are cooled to 6 to 8° C. and stored, whereas 70 kg. are diluted with the 130 kg. pasteurized milk previously stored. This last fraction (200 kg.) representing approximately one-third of the original 1000 kg. in dry matter content, is inoculated with 10 kg. of commercial yoghurt culture and incubated at 42 to 43° C. until the pH reaches 4.2 (58° Soxhlet-Henkel). This acidified fraction is homogenized at 40° C. at 100, then 50 kg./cm.$^2$ in a two-headed homogenizer, cooled at 10 to 15° C. and stored at this temperature.

The non-acidified and the acidified fractions are spray-dried in a drying chamber at 70° C. with 4 to 10 mm. water column under atmospheric in the chamber and 1300 mm. water column pressure in the hot air nozzle.

The acidified fraction with 21% dry matter is injected at low pressure through horizontal nozzles into the vertical hot air current, the non-acidified fraction with 38% dry matter is injected at relatively high pressure (30 to 200 kg./cm.$^2$) through a central nozzle coaxial with the hot air nozzle. 128 kg. of partially acidified milk powder containing approximately 2.4% of lactic acid are thus obtained. 2.4 kg. lactic acid mixed with glucose are coated in a rotating bowl granulator with hydrogenated butter oil containing glyceryl polyricinoleate, the proportions being the following: lactic acid 22.5%, water 2.5%, glucose 25%, hydrogenated butter oil (Wiley melting point 50–52° C.) 46%, glyceryl polyricinoleate 4%. This compound is combined with the partially acidified milk powder.

The powder thus obtained has a dry matter content of 97.0% of which 26.5% is milk fat and 70.5% solids nonfat.

Reconstitution is done by mixing 13.5 g. of powder with 86.5 ml. water at 10 to 40° C., leaving to rest 10 minutes to 2 hours for obtaining a gel. The reconstituted product contains at least 3.5% in weight milk fat and approximately 12.4% total milk solids. After 2 hours its pH is 4.3 to 4.4 (38–42° Soxhlet-Henkel).

EXAMPLE 2

300 g. of citric acid are finely ground in order that the dimension of the particles is comprised between 20 and 50 micrometres. 250 g. hydrogenated butter oil (Wiley melting point 50 to 52° C.) are melted and mixed with 50 g. of glyceryl polyricinoleate.

Maintaining the temperature of the mixture at 50 to 60° C., the 300 g. citric acid are coated with the 300 g. of fatty mixture in a rotating bowl granulator. The duration of the operation is 15 to 30 minutes approximately.

The granules thus obtained are left to rest during 24 hours at ambient temperature. Thereafter they are dipped into liquid nitrogen where they remain 5 minutes approximately at −196° C. Finally the coated granules are sieved with a nylon sieve having apertures of 50 to 60 micrometres.

Adding approximately 4% in weight of the granules obtained to milk in powder form partially acidified by means of *Lactobacillus bulgaricus* and *Streptococcus thermophilus* gives, after reconstitution, a gelled texture which is usual and desirable for this kind of product. With 19% solid matter content, the pH of approximately 5.6 of the reconstituted yoghurt drops to 4.6, 2 hours after reconstitution.

EXAMPLE 3

As in Example 2, granules comprising 22.5% liquid lactic acid and 2.5% water mixed with 25% glucose with a coating of 46% hydrogenated butter oil (Wiley melting point 50–52° C.) and 4% glyceryl polyricinoleate are prepared. These granules are added to a nonacidified whole milk powder containing 14% milk fat and 82% milk solids nonfat, the preparation having 19.0 g. of granules for 100 g. of milk powder. The whole is thereafter diluted, 18.4 g. of powder for 81.6 g. water at 35 to 40° C. After about one hour the suspension has a gelled texture.

EXAMPLE 4

The same granules as in Example 3 are added to a non-acidified whole milk powder containing 17% milk fat, 46% milk solids nonfat and 33.5% of a mixture of glucides, the preparation having 7.5 g. of granules for 100 g. milk powder. The whole is diluted, 20.6 g. of powder being mixed with 79.4 g. water at 35 to 40° C. After approximately one hour the suspension has a partially gelled texture.

I claim:

1. Method of manufacture of an acidified milk product in powder form consisting essentially of combining a fraction of a milk product in powder form biologically acidified to a pH of 4.2 to 4.4 with another fraction of a non-acidified milk product in powder form in order to obtain a pH above 5.2 immediately after reconstitution with water, the weight of the water being 5 to 10 times the weight of the powder, and combining an edible acid compound with controlled release with said two fractions of milk product, said acid compound being coated with an edible fat which is solid at ambient temperature and containing an emulsifier, and being selected from the group consisting of acids solid at ambient temperature and acids liquid at room temperature adsorbed on an edible solid carrier.

2. Method according to claim 1 wherein said biologically-acidified fraction has been brought to approximately 21% dry matter content, acidified with yoghurt culture and dried to powder form.

3. Method of manufacture of an acidified milk product in powder form, comprising the steps of dividing a quantity of concentrated milk into first and second fractions, diluting said first fraction of concentrated milk with a liquid selected from the group consisting of standardized milk and sterile water to a dry matter content suitable for biological acidification, treating said diluted first fraction with a yoghurt culture under conditions such as to bring the pH of said diluted first fraction to between 4.2 and 4.4, drying said first fraction and said second fraction of said quantity of concentrated milk to powder form, the size of said first fraction being such that the total powder from said quantity of concentrated milk, if mixed with from 5 to 10 times its weight of water would result in a solution having a pH above 5.2, combining said first and second fractions to form a mixture, and adding an edible acid in particulate form to said mixture, the edible acid being selected from the group consisting of citric acid, lactic acid and acid fruit concentrate, each particle having a coating of edible fat having a melting point between 45° and 60° C. and an edible emulsifier thereon, the edible acid constituting from 50 to 80% of the weight of said particles, said particles after coating being between 50 and 250 micrometers in size, the quantity of edible acid being such that after 2 hours subsequent to reconstitution, the product has a pH of about 4.3, the edible fat coating having a composition and thickness such that all acid coated therewith is released in from ½ to 2 hours after reconstitution.

4. The process of claim 3 wherein said first fraction constitutes 20 to 30% of said concentrated milk and is diluted to about 21% dry matter content with a liquid selected from the group consisting of standardized, pasteurized milk and sterile water.

5. The process of claim 3 wherein said first fraction and said second fraction are dried separately.

6. The process of claim 3 wherein said first fraction and said second fraction are injected simultaneously into a single drying chamber and dried together.

7. The process of claim 3 wherein the melting point of said edible fat lies between 50 and 52° C.

8. The process of claim 3 wherein said edible fat is selected from the group consisting of the hydrogenated products of butter oil, cocoa butter, soyabean oil, sunflower oil and groundnut oil.

9. The process of claim 3 wherein said emulsifier is selected from the group consisting of soyabean lecithin, glyceryl monostearate and glyceryl polyricinoleate, the first and second of these materials being present in quantity from 0.1 to 10% and the third from 1 to 20% of said coating on said particles.

10. The process of claim 3 wherein said edible acid is liquid and is adsorbed on a material selected from the group consisting of glucose, sucrose and protein.

11. The process of claim 3 wherein said acid particles prior to coating are between 10 and 100 micrometers in size.

12. The process of claim 3 further comprising the steps of melting said edible fat, dispersing said particulate acid in said fat in a granulator to form coated particles, cooling said particles to room temperature, allowing said particles to stand at room temperature for about 24 hours, and immersing said coated particles in liquid nitrogen for about 5 minutes.

13. An acidified milk product in powder form, resulting from the process of claim 1.

References Cited

UNITED STATES PATENTS

| | | | |
|---|---|---|---|
| 3,080,236 | 3/1963 | Ferguson, Jr. | 99—59 |
| 3,708,307 | 1/1973 | Lundstedt | 99—57 X |
| 980,936 | 1/1911 | Federer | 99—95 |
| 3,492,129 | 1/1970 | Carswell et al. | 99—59 X |

FOREIGN PATENTS

| | | | |
|---|---|---|---|
| 15,270 | 1962 | Japan | 99—59 |

DAVID M. NAFF, Primary Examiner

U.S. Cl. X.R.

426—43, 357, 358